(12) United States Patent
Doumaux et al.

(10) Patent No.: US 7,479,181 B2
(45) Date of Patent: *Jan. 20, 2009

(54) INKJET INK COMPOSITION AND METHOD OF MAKING THE SAME

(75) Inventors: Howard A. Doumaux, San Diego, CA (US); Kathryn Nifong Burns, San Diego, CA (US); David M. Mahli, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/496,185

(22) Filed: Jul. 31, 2006

(65) Prior Publication Data

US 2008/0022889 A1 Jan. 31, 2008

(51) Int. Cl.
*C09D 11/02* (2006.01)
*C07C 50/36* (2006.01)
(52) U.S. Cl. .................... 106/31.6; 552/284
(58) Field of Classification Search ............... 106/31.6; 552/284

See application file for complete search history.

(56) References Cited

U.S. PATENT DOCUMENTS

| | | | | |
|---|---|---|---|---|
| 4,705,572 A | * | 11/1987 | Spietschka et al. | 106/493 |
| 5,035,747 A | * | 7/1991 | Dietz et al. | 106/495 |
| 6,231,655 B1 | | 5/2001 | Marritt | |
| 6,648,954 B2 | | 11/2003 | Uemura et al. | |
| 6,702,883 B1 | * | 3/2004 | Sano et al. | 106/31.6 |
| 6,715,869 B1 | * | 4/2004 | Reem et al. | 347/100 |
| 6,719,422 B2 | | 4/2004 | Wu et al. | |
| 6,749,675 B2 | | 6/2004 | Momose | |
| 6,811,597 B2 | | 11/2004 | Oki et al. | |
| 6,821,330 B1 | | 11/2004 | Sano et al. | |
| 6,874,870 B2 | | 4/2005 | Ishikawa et al. | |
| 6,924,035 B2 | | 8/2005 | Auweter et al. | |
| 6,988,795 B2 | | 1/2006 | Doi | |
| 6,997,979 B2 | | 2/2006 | Bauer et al. | |
| 7,004,579 B2 | | 2/2006 | Sato et al. | |
| 7,037,957 B2 | | 5/2006 | Ninomiya et al. | |
| 7,056,378 B2 | * | 6/2006 | Weber et al. | 106/493 |
| 7,056,972 B2 | | 6/2006 | Nakazawa et al. | |
| 7,311,769 B2 | * | 12/2007 | Weber et al. | 106/494 |
| 2003/0116055 A1 | * | 6/2003 | Kubota et al. | 106/31.27 |
| 2004/0094065 A1 | * | 5/2004 | Reem et al. | 106/31.14 |
| 2005/0113476 A1 | | 5/2005 | Akiyama et al. | |
| 2006/0023043 A1 | | 2/2006 | Ishibashi et al. | |
| 2006/0025497 A1 | | 2/2006 | Ushirogouchi et al. | |
| 2006/0074146 A1 | | 4/2006 | Sato et al. | |
| 2006/0117990 A1 | * | 6/2006 | Foster | 106/31.27 |

FOREIGN PATENT DOCUMENTS

| | | |
|---|---|---|
| EP | 0851005 | 7/1998 |
| EP | 1086988 | 3/2001 |
| EP | 1854853 | 11/2007 |
| JP | 62054774 | 3/1987 |
| WO | 2005/049737 | 6/2005 |
| WO | 2006/080497 | 8/2006 |

OTHER PUBLICATIONS

International Search Report for S.N. PCT/US2007/074425 dated Jan. 25, 2008 (6 pages).

* cited by examiner

*Primary Examiner*—Helene Klemanski

(57) ABSTRACT

An inkjet ink composition consists essentially of a vehicle and an effective amount pigment red 168.

26 Claims, No Drawings

INKJET INK COMPOSITION AND METHOD OF MAKING THE SAME

BACKGROUND

The present disclosure relates generally to inkjet ink compositions and methods of making the same.

Secondary color inks have been added to ink sets in an effort to increase the color gamut of the printing system in which the ink sets are used. Many pigments included in secondary color inks are capable of forming images that exhibit some relatively good properties, yet at the same time exhibit other, relatively poor properties. As examples, some pigments generate images having good gloss and chroma, but relatively poor lightfastness (e.g., window, indoor, or outdoor) and/or poor ozonefastness; and other pigments generate images having poor gloss and chroma, but exhibit relatively good lightfastness and/or ozonefastness.

For example, secondary color inks based upon orange or red pigments generally deliver relatively good gloss and chroma. However, these inks may also exhibit relatively poor lightfastness (i.e., color fade resulting from light exposure) and ozonefastness (i.e., color fade resulting form air exposure). Printed images formed from these inks tend to suffer from red, green, blue or other color density loss (i.e., fade) upon exposure to various forms of light (e.g., indoor, window, etc.) or to air over time. Alternatively, orange and red inks formed with magenta and yellow pigments may be formulated to have good lightfastness. However, these inks also tend to exhibit lower chroma or pure color than inks based on a secondary color pigment. The mixed pigment inks (e.g., those formed with magenta and yellow pigments) generally do not supply additional gamut to the printing system in which they are incorporated.

DETAILED DESCRIPTION

Embodiments of the ink composition disclosed herein advantageously include a red ink that exhibits good to excellent lightfastness (window, indoor, and/or outdoor), enhanced chroma, good to excellent ozonefastness, or various combinations thereof.

The term "lightfastness" as used herein refers to the durability of a print when exposed to light. Generally, when an ink is referred to as being "lightfast", it has fade resistance. The term "window" when used in combination with lightfastness generally refers to more extreme lighting conditions, non-limiting examples of which include exposure to direct or indirect sunlight, filtered by glass. The term "indoor" when used in combination with lightfastness generally refers to less extreme lighting conditions, a non-limiting example of which includes exposure to direct or indirect artificial lighting. The term "outdoor" when used in combination with lightfastness generally refers to exposure to direct sunlight without any filters.

The term "ozonefastness" as used herein refers to the durability of a print when exposed to air without intervening isolating (from air) media. Generally, when an ink is referred to as being "ozonefast", it has fade resistance.

Embodiment(s) of the ink composition disclosed herein include an ink vehicle and an effective amount of pigment red 168 (which is commercially available as Hostaperm® Scarlet GO or Scarlet GO transparent from Clariant International Ltd., located in Muttenz, Switzerland).

As used herein, the singular forms of the articles "a," "an," and "the" include plural referents unless the content clearly dictates otherwise. Further, the phrase "effective amount," as used herein, refers to the minimal amount of a substance and/or agent, which is sufficient to achieve a desired and/or required effect. For example, an effective amount of an "ink vehicle" is the minimum amount required in order to create an ink composition, while maintaining properties suitable for effective inkjet printing.

"Liquid vehicle" or "ink vehicle," as used herein, refers to the vehicle in which colorant is placed to form an ink. A wide variety of ink vehicles may be used with the inks, systems, and methods according to embodiments disclosed herein. It is to be understood that the ink composition disclosed herein may be an aqueous based ink, an organic based ink, or combinations thereof. Examples of suitable ink vehicles include, but are not limited to water soluble polymers, surfactants (e.g., non-ionic surfactants, ethoxylated nonionic fluorosurfactants, etc.), solvents, co-solvents, buffers, biocides, sequestering agents, viscosity modifiers, surface-active agents, chelating agents, resins, and/or water, and/or combinations thereof.

In an embodiment, the red ink has an ink vehicle including water soluble polymers, SURFYNOL 440 (a non-ionic surfactant commercially available from Air Products and Chemicals, Inc. located in Allentown, Pa.), glyceryl polyoxyethyl ether, pyrrolidone, glycerol, diethylene glycol, 1,2-hexanediol, Zonyl® FSO (an ethoxylated nonionic fluorosurfactant commercially available from Dupont located in Wilmington, DE), a biocide (a non-limiting example of which is a solution of 1,2-benzisothiazolin-3-one, triethanolamine, and combinations thereof.

In an embodiment, the ink composition also includes a dispersant. A non-limiting example of such a dispersant is styrene acrylic copolymers.

Forming embodiment(s) of the inkjet ink composition includes providing or making the ink vehicle, and adding the effective amount of pigment red 168 thereto. It is to be understood that generally the pigment red 168 contributes to the scarlet hue exhibited by the ink composition disclosed herein.

In an embodiment, the effective amount of pigment red 168 has a pigment load sufficient to provide an absorbance maxima, ranging from about 0.075 to about 1.2 at a 1:2,500 dilution of the red ink, at a wavelength maxima ranging from about 480 nm to about 580 nm. In another embodiment, the amount of pigment red 168 in the ink composition ranges from about 1 wt. % to about 15 wt. %. Alternately, the amount of pigment red 168 may range from about 2 wt. % to about 8 wt. %, or from about 3 wt. % to about 6 wt. %.

The pigment red 168 may be in the form of solid pigment particles. Generally, an average particle size of the pigment red 168 ranges from about 30 nm to about 200 nm.

In another embodiment of the inkjet ink composition, effective amounts of other pigments (in addition to the pigment red 168) may be added to the ink vehicle. Non-limiting examples of such other pigments include yellow pigment(s), scarlet pigment(s), magenta pigment(s), or combinations thereof.

In an embodiment of using embodiment(s) of the inkjet ink composition, the ink composition is established on at least a portion of a substrate to form an image. The amount of the ink composition established depends, at least in part, on the desirable image to be formed. The image may include alphanumeric indicia, graphical indicia, or combinations thereof. Furthermore, the inks may be established substantially simultaneously or sequentially via inkjet printing techniques. Non-limiting examples of suitable inkjet printing techniques include piezoelectric inkjet printing, thermal inkjet printing, or combinations thereof.

Examples of suitable substrate materials include, but are not limited to plain papers, microporous photopapers, coated papers, glossy photopapers, semi-gloss photopapers, heavy weight matte papers, billboard papers, digital fine art papers, calendared papers, vinyl papers, or combinations thereof.

Printing of the inkjet ink composition(s) disclosed herein results in image(s) having colors ranging from orange to reddish scarlet. It is to be understood that by altering component(s) or amounts of component(s) in the ink vehicle, the resulting color of the printed image may be changed. The color of the printed image formed with embodiment(s) of the ink composition may also depend, at least in part, on the pigment loading, the printing technology used (i.e., solvent based or water based), or combinations thereof.

It is to be understood that the image(s) formed from embodiments of the ink composition generally exhibit good to excellent lightfastness, good to excellent ozonefastness, enhanced chroma, and/or combinations thereof.

To further illustrate embodiment(s) of the present disclosure, various examples are given herein. It is to be understood that these examples are provided for illustrative purposes and are not to be construed as limiting the scope of the disclosed embodiment(s).

EXAMPLES

Five different scarlet/red/red-orange inks were prepared, each with about 4 wt. % of a different pigment (e.g., pigment red 168, pigment red 177, pigment red 208, pigment red 254-Type 1, and pigment red 254-Type 2). The vehicle for each of the inks included about 0.7 wt. % water soluble polymer, about 0.5 wt. % non-ionic surfactant, about 3 wt. % glyceryl polyoxyethyl ether, about 6 wt. % 2-pyrrolidone, about 5 wt. % glycerol, about 4 wt. % 1,2-hexanediol, about 0.19 wt. % fluorinated surfactant, about 0.15 wt. % biocide, about 1 wt. % triethanolamine, and a balance of de-ionized water. The inks were printed on three different types of media, including heavy weight matte paper, microporous photo paper, and digital fine art paper. The ozonefastness and indoor lightfastness were measured for each of the printed inks.

Exemplary measurement techniques for ozonefastness and lightfastness have been reported at various meetings of The Society for Imaging Science and Technology. These techniques generally involve exposing samples to high light intensities or high concentrations of ozone gas in air to accelerate sample testing. Conversion factors of klux-hours of exposure to 1 year of indoor, window, or outdoor light exposure have been proposed. Similar conversion factors have been proposed to convert ppm-hours of ozone exposure to 1 year of ozone exposure. The "OD=0.6" and "OD=1" indicate the optical densities at which the fade was determined.

Qualitative ozonefastness and indoor lightfastness results are shown in Table 1. The term "Excellent" indicates that fade does not occur until 150 years or more; the term "Good" indicates that fade occurs between 100 and 150 years; the term "Medium" indicates that fade occurs between 50 and 100 years; and the term "Poor" indicates fade occurs between 0 and 50 years.

TABLE 1

Ozonefastness and Lightfastness for inks formed with various pigment reds

| Pigment Red | Loading (Wt. %) | Media | Ozone Fade (OD = 0.6) | Ozone Fade (OD = 1) | Indoor Light Fade (OD = 0.6) | Indoor Light Fade (OD = 1) |
|---|---|---|---|---|---|---|
| PR168 | 4 | Heavy weight matte paper | No Fade | Medium | Excellent | Excellent |
| PR177 | 4 | Heavy weight matte paper | Excellent | Medium | Excellent | Excellent |
| PR208 | 4 | Heavy weight matte paper | Medium | Medium | Medium | Poor |
| PR254-Type 1 | 4 | Heavy weight matte paper | Poor | Poor | Excellent | Excellent |
| PR254-Type 2 | 4 | Heavy weight matte paper | Poor | Poor | Excellent | Excellent |
| PR168 | 4 | Micro-porous photopaper | Medium | No Fade | Excellent | Excellent |
| PR177 | 4 | Micro-porous photopaper | Excellent | Excellent | Poor | Good |
| PR208 | 4 | Micro-porous photopaper | Medium | Medium | Medium | Medium |
| PR254-Type 1 | 4 | Micro-porous photopaper | Poor | Poor | Good | Excellent |
| PR254-Type 2 | 4 | Micro-porous photopaper | Poor | Poor | Excellent | Excellent |
| PR168 | 4 | Digital fine art paper | No Fade | Medium | Excellent | Excellent |
| PR177 | 4 | Digital fine art paper | Good | Good | Excellent | Excellent |
| PR208 | 4 | Digital fine art paper | Poor | Poor | Poor | Medium |
| PR254-Type 1 | 4 | Digital fine art paper | Poor | Poor | Excellent | Excellent |
| PR254-Type 2 | 4 | Digital fine art paper | Poor | Good | Excellent | Excellent |

As depicted in Table 1, the images formed with ink made with pigment red 168 exhibited medium to beyond excellent (i.e., no fade) ozonefastness and excellent lightfastness on each of the media types. On each of the media types, the PR254-Type 1 and PR254-Type 2 exhibited worse ozonefastness results when compared to the lightfastness results. The results for the pigment red 177 varied, depending on the type of media used. Pigment red 208 exhibited generally poor to medium results on each of the media types.

The images printed with the five different inks were also tested for chroma, and the qualitative results are shown in Table 2. Chroma was measured with a Graytag Macbeth SpectroScan. In Table 2, the term "Good" indicates that the chroma value was above 90; the term "Medium" indicates that the chroma value was between 80 and 90; and the term "Poor" indicates the chroma value was less than 80.

TABLE 2

| Ink | Chroma values Max c* | Hue of Printed Image |
|---|---|---|
| PR168 | Good | Reddish Orange |
| PR177 | Poor | Red |
| PR208 | Medium | Orangish Red |
| PR254-Type 1 | Good | Orangish Red |
| PR254-Type 2 | Good | Orangish Red |

While the chroma of the inks made with PR254-Type 1 and PR254-Type 2 are comparable to the chroma of the ink made with PR-168, the combination of the lightfastness, ozonefastness, and chroma results indicates that the ink including PR168 offers a variety of enhanced properties.

While several embodiments have been described in detail, it will be apparent to those skilled in the art that the disclosed embodiments may be modified. Therefore, the foregoing description is to be considered exemplary rather than limiting.

What is claimed is:

1. An inkjet ink composition, consisting essentially of:
   a vehicle; and
   an effective amount of pigment red 168; and
   styrene-acrylic copolymer dispersed throughout the vehicle;
   wherein the effective amount of pigment red 168 is from about 3 to about 15 weight percent concentration in the inkjet ink composition.

2. The inkjet ink composition as defined in claim 1 wherein the pigment red 168 is in the form of solid pigment particles.

3. The inkjet ink composition as defined in claim 2 wherein the effective amount of pigment red 168 has a pigment load sufficient to provide an absorbance at a wavelength maxima ranging from about 480 nm to about 580 nm, the absorbance ranging from about 0.225 to about 1.2 at a 1:2,500 dilution of the ink.

4. The inkjet ink composition as defined in claim 1 wherein the inkjet ink composition is an aqueous based ink, an organic based ink, or combinations thereof.

5. The inkjet ink composition as defined in claim 1 wherein the vehicle includes a component selected from the group consisting of water soluble polymers, non-ionic surfactants, glyceryl polyoxyethyl ether, pyrrolidone, glycerol, diethylene glycol, 1, 2-hexanediol, ethoxylated nonionic fluorosurfactants, biocides, triethanolamine, and combinations thereof.

6. The inkjet ink composition as defined in claim 1 wherein the ink composition exhibits a scarlet hue.

7. A method of using the inkjet ink composition as defined in claim 1, the method comprising:
   a step of establishing the inkjet ink composition on at least a portion of a substrate.

8. The method as defined in claim 7 wherein the step of establishing is accomplished via printing the inkjet ink composition utilizing thermal inkjet printing, piezoelectric inkjet printing, or combinations thereof.

9. The method as defined in claim 7 wherein the substrate is selected from the group consisting of plain paper, microporous photopaper, coated paper, glossy photopaper, semi-gloss photopaper, heavy weight matte paper, billboard paper, digital fine art paper, calendared paper, vinyl paper, and combinations thereof.

10. The method as defined in claim 9 wherein the established inkjet ink composition forms an image exhibiting at least one of good to excellent lightfastness, good to excellent ozonefastness, enhanced chroma, or combinations thereof.

11. A method of making an inkjet ink composition, comprising:
   providing an ink vehicle; and
   adding an effective amount of pigment red 168 and styrene-acrylic copolymer to the ink vehicle;
   wherein the effective amount of pigment red 168 is from about 3 to about 15 weight percent concentration in the inkjet ink composition.

12. The method as defined in claim 11 wherein the pigment red 168 is in the form of solid pigment particles.

13. The method as defined in claim 11 wherein the effective amount of pigment red 168 has a pigment load sufficient to provide an absorbance at a wavelength maxima ranging from about 480 nm to about 580 nm, the absorbance ranging from about 0.225 to about 1.2 at a 1:2,500 dilution of the ink.

14. The method as defined in claim 11 wherein the inkjet ink composition is an aqueous based ink, an organic based ink, or combinations thereof.

15. The method as defined in claim 11, further comprising varying at least one of a component or an amount of a component in the ink vehicle, thereby altering a color of an image printed with the inkjet ink composition.

16. An inkjet ink composition, comprising:
   a vehicle; and
   an effective amount of pigment red 168; and
   styrene-acrylic copolymer dispersed throughout the vehicle;
   wherein the effective amount of pigment red 168 is from about 3 to about 15 weight percent concentration in the inkjet ink composition.

17. The inkjet ink composition as defined in claim 16, further comprising effective amounts of at least one other pigment selected from the group consisting of yellow pigments, scarlet pigments, magenta pigments, and combinations thereof.

18. The inkjet ink composition as defined in claim 16 wherein the pigment red 168 is in the form of solid pigment particles.

19. The inkjet ink composition as defined in claim 18 wherein the effective amount of pigment red 168 has a pigment load sufficient to provide an absorbance at a wavelength maxima ranging from about 480 nm to about 580 nm, the absorbance ranging from about 0.225 to about 1.2 at a 1:2,500 dilution of the ink.

20. The inkjet ink composition as defined in claim 16 wherein the vehicle includes a component selected from the group consisting of water soluble polymers, non-ionic surfactants, glyceryl polyoxyethyl ether, pyrrolidone, glycerol, diethylene glycol, 1,2-hexanediol, ethoxylated nonionic fluorosurfactants, biocides, triethanolamine, and combinations thereof.

21. The inkjet ink composition as defined in claim 16 wherein the ink composition exhibits a scarlet hue.

22. An inkjet ink composition, comprising:
   a vehicle having a styrene-acrylic copolymer dispersed therein; and
   an effective amount of pigment red 168 in the form of solid pigment particles having an average size ranging from about 30 nm to about 200 nm, wherein the effective amount of pigment red 168 is from about 3 to about 15 weight percent concentration in the inkjet ink composition.

23. The inkjet ink composition as defined in claim 22 wherein the vehicle further includes a component selected from the group consisting of water soluble polymers, nonionic surfactants, glyceryl polyoxyethyl ether, pyrrolidone, glycerol, diethylene glycol, 1,2-hexanediol, ethoxylated nonionic fluorosurfactants, biocides, triethanolamine, and combinations thereof.

24. The inkjet ink composition as defined in claim 22 wherein the ink composition exhibits a scarlet hue.

25. The inkjet ink composition as defined in claim 22 wherein the effective amount of pigment red 168 has a pigment load sufficient to provide an absorbance at a wavelength maxima ranging from about 480 nm to about 580 nm, the absorbance ranging from about 0.225 to about 1.2 at a 1:2,500 dilution of the ink.

26. The inkjet ink composition as defined in claim 22 further comprising effective amounts of at least one other pigment selected from the group consisting of yellow pigments, scarlet pigments, magenta pigments, and combinations thereof.

* * * * *

UNITED STATES PATENT AND TRADEMARK OFFICE
CERTIFICATE OF CORRECTION

| | | |
|---|---|---|
| PATENT NO. | : 7,479,181 B2 | Page 1 of 1 |
| APPLICATION NO. | : 11/496185 | |
| DATED | : January 20, 2009 | |
| INVENTOR(S) | : Howard A. Doumaux et al. | |

It is certified that error appears in the above-identified patent and that said Letters Patent is hereby corrected as shown below:

In column 5, line 37, in Claim 1, after "vehicle;" delete "and".

In column 5, line 59, in Claim 5, delete "1, 2-hexanediol," and insert -- 1,2-hexanediol, --, therefor.

In column 6, line 11, in Claim 10, delete "claim 9" and insert -- claim 7 --, therefor.

In column 6, line 38, in Claim 16, after "vehicle;" delete "and".

In column 6, line 41, in Claim 16, after "vehicle" delete ":" and insert -- ; --, therefor.

Signed and Sealed this

Thirteenth Day of July, 2010

David J. Kappos
*Director of the United States Patent and Trademark Office*